(No Model.)
J. STROUD.
BASTING AND ROASTING PAN.
No. 527,252. Patented Oct. 9, 1894.
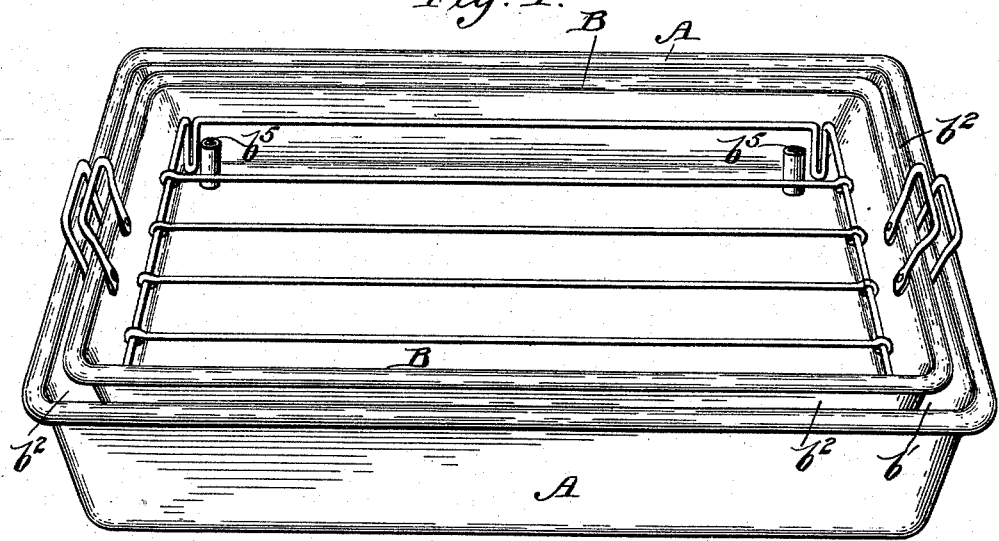
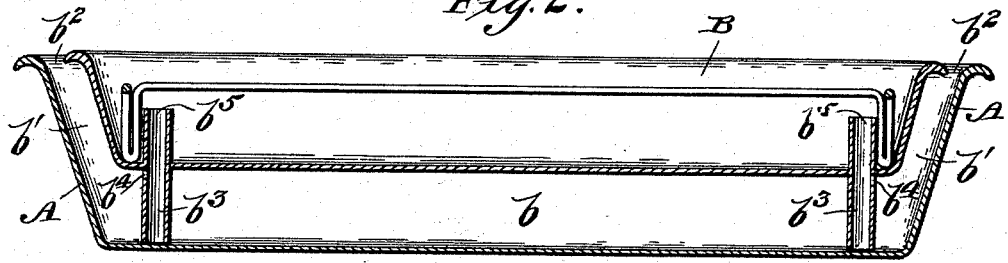
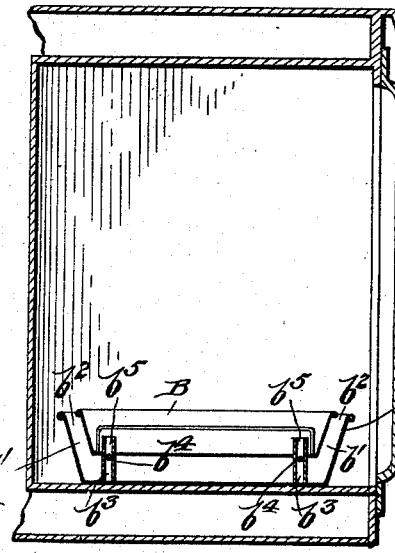
Witnesses:
Inventor:
James Stroud
By his Attys
Mason Fenwick Lawrence

UNITED STATES PATENT OFFICE.

JAMES STROUD, OF NEW YORK, N. Y.

BASTING AND ROASTING PAN.

SPECIFICATION forming part of Letters Patent No. 527,252, dated October 9, 1894.

Application filed December 11, 1893. Serial No. 493,358. (No model.)

*To all whom it may concern:*

Be it known that I, JAMES STROUD, a citizen of the United States, residing at New York, in the county of New York and State of New York, have invented certain new and useful Improvements in Basting and Roasting Pans; and I do hereby declare the following to be a full, clear, and exact description of the invention, such as will enable others skilled in the art to which it appertains to make and use the same.

My invention relates to an improved roasting and basting pan, and it consists of two open top vessels arranged one within the other, the upper vessel being supported within the lower vessel, and of such a depth and diameter as to allow a water space between the bottoms of the two pans, a steam circulating space between the side walls of the two vessels and a steam escape passage between the upper edges of the vessels.

It also consists in providing the upper vessel with hollow supporting legs having steam inlet and outlet passages which communicate with the interior of the vessels, and it also consists in certain other novel constructions, combinations and arrangements of parts, as will be hereinafter described and claimed.

In the accompanying drawings, Figure 1 is a perspective view of my improved basting and roasting pan, as it appears when in condition for use. Fig. 2 is a longitudinal section of the same, and Fig. 3 is a transverse section of the pan applied in a stove oven.

A in the drawings represents an open top outer vessel of any suitable shape, but preferably rectangular as shown, which is intended to receive and hold water, and within this vessel an open top vessel B for meat, is located and supported. The inner vessel B is of such less depth and smaller diameter than the outer vessel A, that a water space is formed between the bottoms of the two vessels, a steam circulating space $b'$ between the side walls of the two vessels, and a steam escape passage $b^2$ between the upper edges of the two vessels, so that the steam formed in the outer vessel can escape through the passage $b^2$ and come in contact with the meat on all sides, and thus prevent the meat becoming too dry during the cooking operation. The inner vessel B is provided with supporting legs $b^3$ which are preferably made hollow and provided with steam inlet and outlet passages $b^4$, $b^5$ respectively. These legs when made hollow extend up a short distance above the bottom of the inner vessel B, and are open at top, as shown, to form the steam escape passages $b^5$. By this construction the juices from the meat can collect in the bottom of the inner vessel without wasting into the lower vessel, and also a perfect basting and roasting operation secured, and the meat when done, will be juicy and browned on bottom as well as on top, and during the process of cooking will require little or no attention.

C represents a raised, open rack which is placed within the inner vessel B, which is preferably constructed of wire, as when thus constructed, it is light, durable and cheap. By the use of this rack, the meat being cooked will be elevated from the bottom of the inner vessel B so that steam escaping through the passage $b'$ between the upper edges of the two vessels and from the passage $b^4$ of the hollow legs, will come in contact with the meat, and this, with the heat of the oven, will thoroughly and perfectly roast and baste the meat.

What I claim as my invention is—

1. A basting and roasting pan comprising an open top outer vessel for containing water, and a smaller, open top inner vessel for meat, said inner vessel provided with hollow supporting legs having steam inlet and outlet passages, the inner vessel being of such a diameter and depth relative to the outer vessel and that there is secured a water space between the bottoms of the two vessels, and a steam circulating space between the side walls of the two vessels, substantially as described.

2. A basting and roasting pan comprising an outer vessel for containing water and a smaller, open top inner vessel for meat, provided with hollow supporting legs having steam inlet and oulet passages, said legs extending up a short distance above the bottom of the inner vesesel, and an elevated open rack located within the inner vessel, the inner vessel being of such a depth and diameter relative to the outer vessel as to form a water space between the bottoms of the two vessels, a steam circulating space between the side walls of the vessels and a steam escape passage between the upper edges of the vessels, substantially as described.

In testimony whereof I hereunto affix my signature in presence of two witnesses.

JAMES STROUD.

Witnesses:
A. V. BARBERIE,
S. C. OUGHELTREE.